S. R. BATCHELOR.
Axle-Box.
No. 12,154.
Patented Jan. 2, 1855.
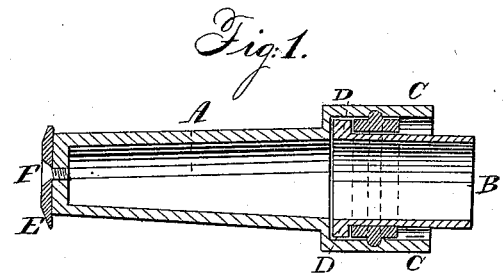
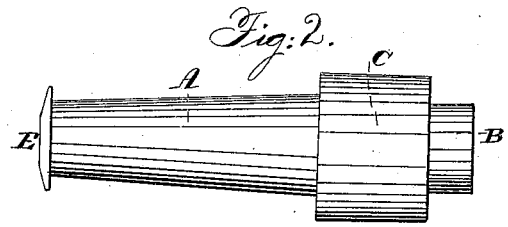

UNITED STATES PATENT OFFICE.

S. B. BATCHELOR, OF LOWVILLE, NEW YORK.

JOURNAL-BOX FOR CARRIAGES.

Specification of Letters Patent No. 12,154, dated January 2, 1855.

*To all whom it may concern:*

Be it known that I, S. B. BATCHELOR, of Lowville, in the county of Lewis and State of New York, have invented a new and Improved Mode for the Manufacture of Pipe Journal-Boxes for Carriages with Shoulder-Bands Connected Therewith, and I do hereby declare that the following is a full and exact description thereof, reference being had to the accompanying drawings and to the letters of reference marked thereon, Figure 1 being a longitudinal section taken through the center of said journal-box; Fig. 2 being a side view of the journal-box with the shoulder-band connected.

Similar letters refer to like parts in both figures.

The nature of my invention consists in constructing a pipe journal carriage box with a united stationary chamber or recess near the inner end of said box embracing a single flanched shoulder band permitting the box to rotate on the axle while the shoulder band is made fast to the axle so constructed as to prevent the axle from breaking when connected with the journal box with a plate of iron placed across the outer end of the journal pipe, A, with each end projecting being made fast thereto with a tightening screw for the purpose of securing the journal pipe in the hub of the wheel.

I construct my pipe journal box in two sections, A being outer or longest section, B being the inner or short section.

I cast the pipe A with the small end closed and the inner end enlarged forming an outwardly projecting ledge C for the purpose of receiving the flanched shoulder band D and the section of pipe B and also forming the sand band. On the inner side of the ledge C on the pipe, A, is a smoothly turned recess embracing the flanched shoulder band, D. In this recess at a suitable distance from the flanch on said shoulder band to admit of a suitable vibration endwise of the journal box on its axle I make a small chamber by turning a slot in the inner side of said recess for the purpose of connecting the section of pipe, A, with the section of pipe, B. I turn a bead on the outer surface of the section of pipe, B, corresponding with the slot or chamber made in the inner side of the recess in the section of pipe A. I then place the flanched shoulder band in the recess in the ledge, C, on the pipe, A, which is expanded by heat sufficient to receive the section of pipe, B, passing on the outside of the tube of the shoulder band, D, with the bead on the pipe B embraced in the slot in the recess in section of pipe, A, which is contracted by cooling and connects the pipes A and B firmly and immovably together allowing the shoulder band to rotate inside of the pipe, A. On the outer or small end of the pipe A I place a projecting cap, E, which is screwed to the pipe A by means of the tightening screw F the cap E being put on the end of the pipe, A, after it is put through the carriage hub firmly secures it in the hub by means of the screw F.

What I claim as my invention and desire to secure by Letters Patent is—

The mode of constructing the stationary inseparable united recess in pipe A in combination with the single adjustable axle shoulder band, D, and sand band C, with the cap, E, and screw F as herein described or in any other manner substantially the same by which I am enabled to use any axle of the common manufacture as herein set forth.

S. B. BATCHELOR.

Witnesses:
A. K. HADDEN,
G. S. CASE.